No. 851,277. PATENTED APR. 23, 1907.
F. L. CLARK.
FLUID PRESSURE BRAKE.
APPLICATION FILED JULY 14, 1904.
2 SHEETS—SHEET 1.
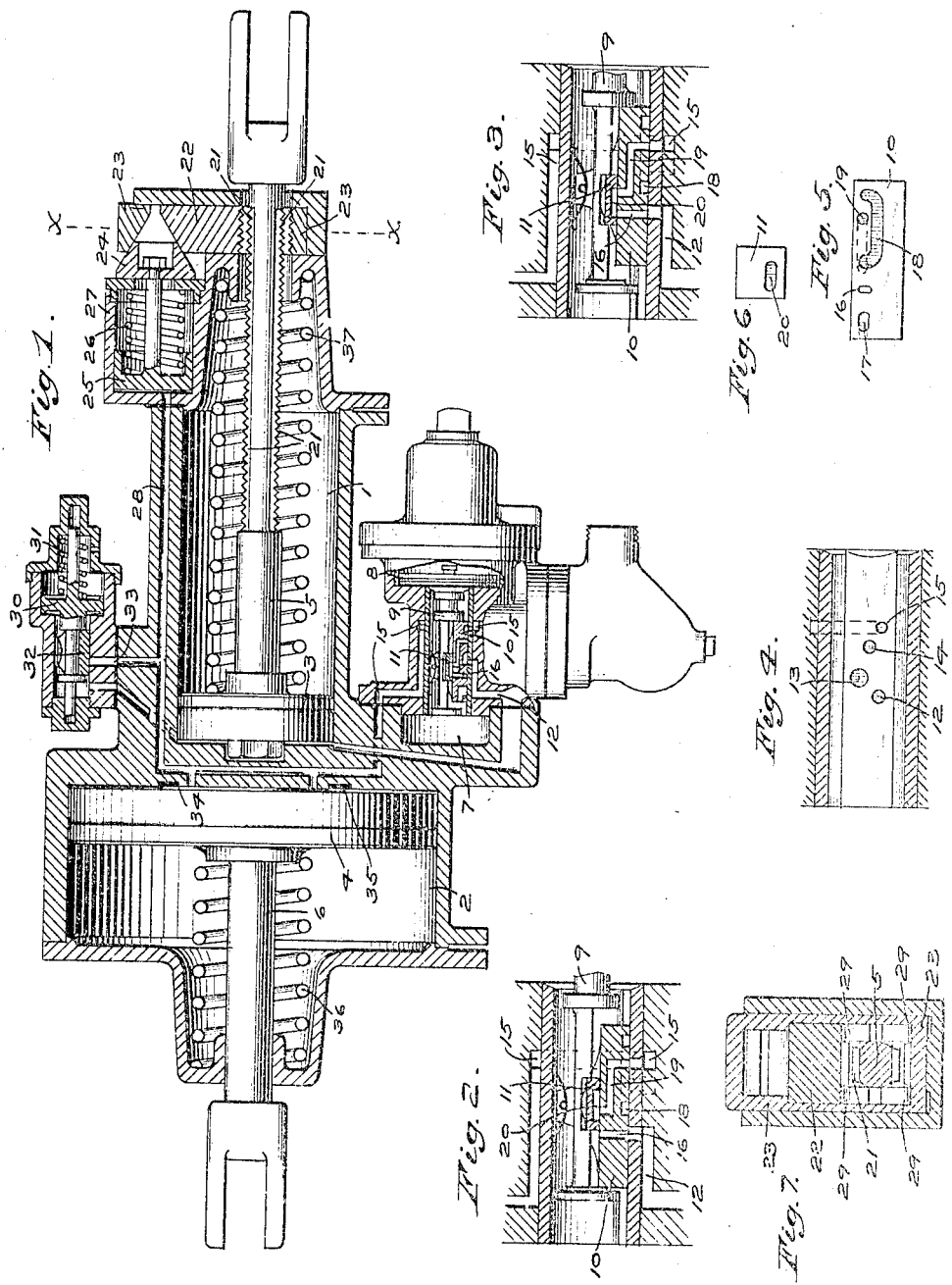
WITNESSES
INVENTOR
Francis L. Clark

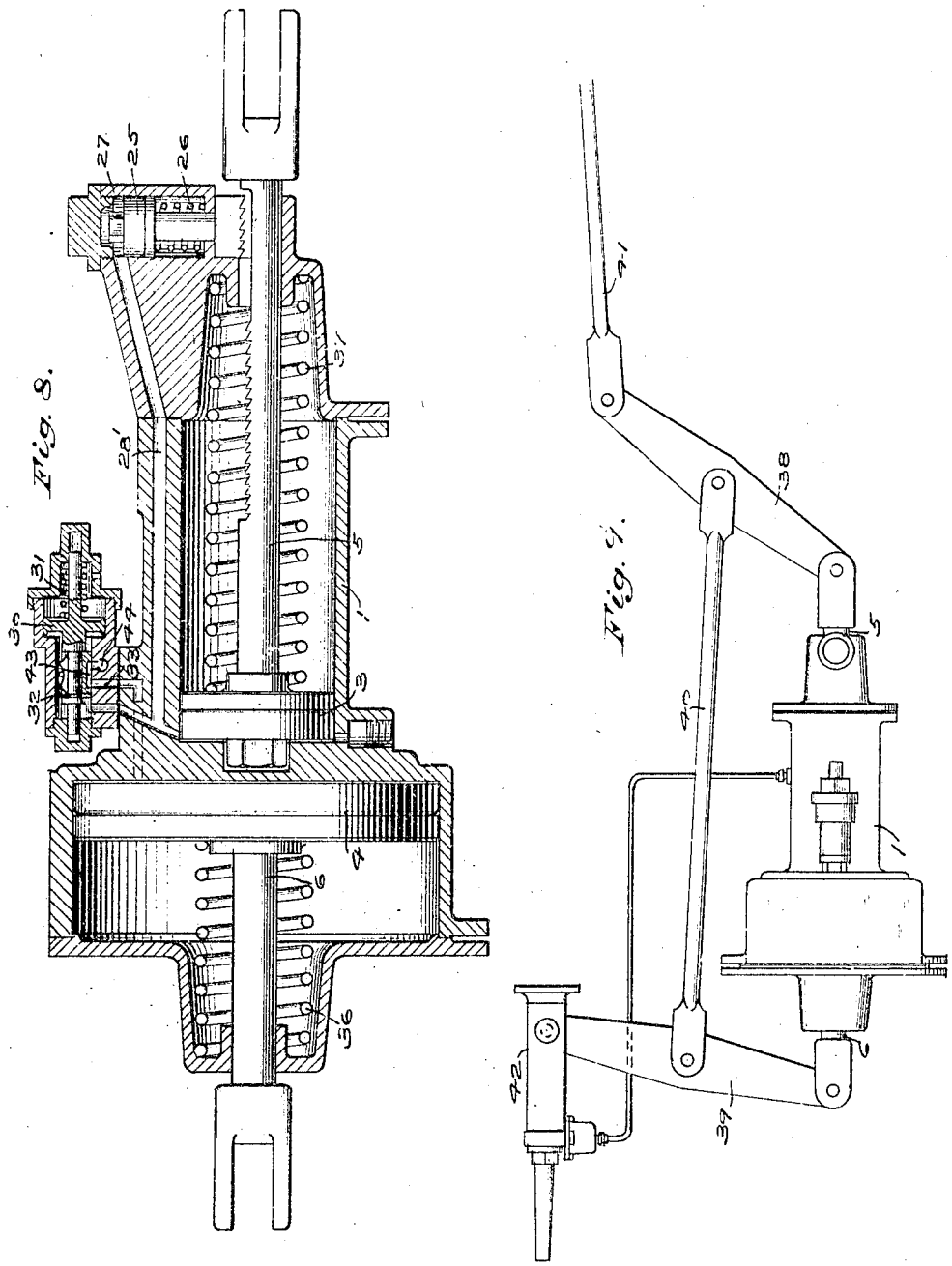

UNITED STATES PATENT OFFICE.

FRANCIS L. CLARK, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 851,277.      Specification of Letters Patent.      Patented April 23, 1907.

Application filed July 14, 1904. Serial No. 216,628.

*To all whom it may concern:*

Be it known that I, FRANCIS L. CLARK, a citizen of the United States, residing in Pittsburg, county of Allegheny, and State of Pennsylvania, have invented a certain new and useful Improvement in Fluid-Pressure Brakes, of which the following is a specification.

This invention relates to fluid pressure brakes and particularly to the brake cylinder part of the apparatus, the main object being to secure a higher and more efficient braking power with a less consumption of compressed air or other fluid.

For this purpose the apparatus comprises two brake cylinders, the first a small primary cylinder for taking up the slack in the rigging and perhaps applying the brake shoes with a light or moderate pressure, and the secondary large cylinder into which the air cylinder pressure is admitted subsequently to the movement of the first brake piston and thereby greatly augments the braking pressure with a slight movement of the second piston and the use of a correspondingly small amount of compressed air. The cylinders are preferably arranged in line with each other and provided with pistons adapted to move in opposite directions and connected to different levers of the brake rigging.

A certain amount of travel of the brake piston is ordinarily necessary to take up slack and bring the brake shoes against the wheels and where a single brake cylinder of a size suitable for heavy braking is employed it is obvious that a large volume of air is required to fill the cylinder and apply the brakes with effective pressure. By the use of the small primary cylinder for taking up the slack and the large secondary cylinder for then reinforcing the pressure with which the brake is applied, as in accordance with this invention, it will readily be apparent that the same degree of braking force may be secured with the use of a much smaller amount of compressed air.

The relative size of the cylinders may be varied to give any desired result and various means may be employed for controlling the admission of air to the second brake cylinder. Such means may be operated by the movement of the small brake piston or by the pressure of the primary cylinder or by the triple valve device or in any other way desired.

Where the brake pistons act in opposite directions and are connected up to different levers of the brake rigging some means must be employed for locking the primary brake piston when it has completed its stroke and such locking device is preferably actuated by air pressure, although other locking mechanism may be used, if desired.

In the accompanying drawings, Figure 1 is a longitudinal section of a double brake cylinder and triple valve device constructed according to the preferred form of my invention, in which the admission of air to the second brake cylinder is controlled by the triple valve, and a locking device operated by air pressure is employed for locking the primary brake piston; Fig. 2 a sectional view of a portion of the triple valve device showing the parts in service position; Fig. 3 a similar view showing the parts in lap position; Fig. 4 a plan view of the seat of the main slide valve of the triple valve device; Fig. 5 a face view of the main slide valve; Fig. 6 a face view of the small graduating slide valve; Fig. 7 a transverse section of the locking mechanism taken on the line $x$—$x$ of Fig. 1; Fig. 8 a longitudinal sectional view showing a modification of my invention, and Fig. 9 a diagrammatic plan view showing one form of brake rigging construction.

According to the design shown in Fig. 1, the small primary brake cylinder 1 and the large secondary brake cylinder 2, are formed integral and contain their respective pistons 3 and 4 and rods 5 and 6, which operate in opposite directions.

The triple valve device is preferably secured to the common pressure head of the brake cylinders having a chamber 7 adapted to be connected to the auxiliary reservoir in the usual way. As shown in the drawing the triple valve device comprises the usual piston 8, stem 9, main slide valve 10 and graduating slide valve 11. In the main slide valve seat are located the usual service port 12 leading to the first brake cylinder, quick action port 13 leading to the usual emergency piston, and exhaust port 14 leading to the atmosphere. In addition to this ordinary construction there is provided a port 15 leading to the large secondary brake cylinder.

The main slide valve is provided with service or graduating port 16, emergency port 17, exhaust cavity 18 and additional port 19, while the graduating slide valve 11 has a cavity 20 for connecting ports 16 and 19 of the main slide valve when the parts are in release position as shown in Fig. 1, or in lap position as shown in Fig. 3.

In order to hold the first brake piston and prevent it from being forced back when air is admitted to the second brake cylinder, a locking device may be employed, and according to the form of mechanism shown in Figs. 1 and 7, this comprises oppositely located rows of inclined teeth 21 on the rod 5, two sliding jaws 22 and 23 having corresponding teeth for engaging the rod, a wedge 24 for moving the jaws, a piston 25 and spring 26 located in cylinder 27 for actuating the wedge, the cylinder communicating by means of a port 28 with the port 15 and the second brake cylinder; springs 29 may be employed for normally separating the jaws 22 and 23 for releasing the clamping mechanism.

A pressure operated valve device comprising a piston 30 subject to the opposing pressures of the first brake cylinder and an adjustable spring 31 may also be used for moving a valve 32 for controlling a port 33 leading to the second brake cylinder.

In order to insure the locking of the first brake piston before the large piston of the second brake cylinder moves, the second piston 4 may be provided with a circular projecting rib or flange 34 adapted to be seated by the spring 36 against a gasket 35 when the piston is in release position, the ports communicating with the second brake cylinder within the circular flange which is of a diameter only slightly greater than that of the first brake piston 3.

The operation is as follows: When a service application of the brakes is made the triple valve moves back to service position, indicated in Fig. 2, and air under pressure from the auxiliary reservoir flows to the primary brake cylinder actuating the piston 3 to take up the slack in the brake rigging and apply the shoes to the wheels with more or less pressure according to the size of the cylinder 1. When the triple valve moves to lap position, see Fig. 3, the cavity 20 connects ports 16 and 19, thereby establishing communication from the first brake cylinder to the second through ports 12 and 15 and to the cylinder 27 of the pressure operated locking device through port 28. As the piston 25 of the locking mechanism moves with less resistance than the secondary brake piston 2, the locking piston instantly moves the wedge 26 and actuates the jaws 22 and 23 to clamp the rod 5, thereby locking the same against return movement. The air which was contained in the first brake cylinder then expands into the second brake cylinder but, as the brake shoes are already bearing against the wheels with some pressure, the movement of the second brake piston is very slight, consequently the volume to be filled by the air is not much greater than before while the piston 4 which is now the effective one in exerting pressure upon the brake rigging has a much greater area than the primary brake piston. The braking pressure will therefore be greatly increased with the same consumption of air.

Referring to Fig. 9, it will be seen that when the rod 5 of the first brake cylinder moves out the lever 38 is turned about its connection with rod 40 as a fulcrum to exert a pull upon rod 41 to take up the slack in the rigging and apply the brakes, but when rod 5 is clamped and the rod 6 of the large piston moves out, the lever 39 acting through rod 40 turns lever 38 about rod 5 as a fulcrum and thereby exerts additional stress upon the rod 41 to apply the brake shoes with greater pressure. A slack adjuster 42 may be conveniently applied to the stationary fulcrum of lever 39, if desired. When the brakes are released and the triple valve returns to release position, Fig. 1, the air from the first brake cylinder is discharged to the atmosphere through port 12, cavity 18 and exhaust port 14, while the air from the second brake cylinder is released through port 15, cavity 18 and exhaust port 14. The instant that pressure is released from piston 25, the spring 26 withdraws the wedge 24 and the jaws 22 and 23 are released from the rod 5 by the action of springs 29 and also by the brake cylinder spring 37 acting through the inclined surfaces of the teeth 21.

It is not thought that the use of the projecting flange 34 and gasket 35 will be necessary to insure the movement of the locking piston in advance of that of the second brake piston, but if such construction is employed it will be seen that as the pressure is admitted to the second brake cylinder and the locking cylinder the area of the piston 4 which is then subject to the pressure is only slightly greater than that of the first brake piston 3, consequently pressure at substantially the same degree as obtained in the first brake cylinder is admitted to the locking cylinder and piston 25 before the second brake piston is moved. As soon as the flange 34 is moved away from the gasket 35 the full braking pressure is obtained.

If a continuous full service application should be made, that is, one in which the triple valve does not move back from service to lap position, the air under pressure continues to flow into the first brake cylinder until the pressure rises therein and upon piston 30 to a degree sufficient to compress the spring 31, which may be set for any desired amount, say fifty pounds per square inch. The valve 32 is then operated to open the port 33 and establish communication with the second brake cylinder and the pressure locking cylinder, so that full braking power is obtained in either case.

According to the modification shown in Fig. 8 the air is supplied from the first brake cylinder to the second only through the valve device operated by the first brake cylinder pressure, the valve being provided with an additional cavity 43 and exhaust port 44 for releasing air from the second brake cylinder to the atmosphere when the first brake cylinder is released. In this form of device the locking cylinder is connected directly to the primary brake cylinder through a port 28', and the piston 25 operates a clutch or block having teeth for engaging the teeth carried by the brake piston rod 5 for locking the same.

Having now described my invention, what I claim as new and desire to secure by Letters Patent is:—

1. In an air brake, the combination with a primary brake cylinder and piston, and a secondary brake cylinder and piston independent of the first brake piston, of a fluid pressure operated clutch or locking mechanism for one of the brake pistons.

2. In an air brake, the combination with a primary brake cylinder and piston for operating a brake lever, of a secondary brake cylinder and piston for operating another brake lever, and a fluid pressure operated clutch or locking mechanism for the primary brake piston.

3. In an air brake, the combination of a primary brake cylinder and a secondary brake cylinder in alinement with each other and having pistons operating in opposite directions, and a fluid pressure operated locking mechanism for one of the brake pistons.

4. In an air brake, the combination with a primary brake cylinder and piston, of a secondary brake cylinder and piston, means for supplying air from the primary brake cylinder to the second brake cylinder after the first piston has completed its stroke and a fluid pressure operated locking mechanism for the first brake piston.

5. In an air brake, the combination with a primary brake cylinder and piston, of a secondary brake cylinder and piston, and means operated by brake cylinder pressure for locking the first brake piston after it has completed its stroke.

6. In an air brake, the combination with a primary brake cylinder and a second brake cylinder of means operated by variations in train pipe pressure for controlling the admission of air from the primary brake cylinder to the second brake cylinder.

7. In an air brake, the combination with a primary brake cylinder and a second brake cylinder of a valve device operated by train pipe pressure for controlling the admission of air from the primary brake cylinder to the second brake cylinder.

8. In an air brake, the combination with a primary brake cylinder, a secondary brake cylinder, and triple valve device, of means operated by the triple valve device for controlling the admission of air from the first brake cylinder to the second brake cylinder.

9. In an air brake, the combination with a primary brake cylinder and a secondary brake cylinder of a triple valve device having ports for first admitting air to the primary brake cylinder in service position and ports for establishing communication from the primary brake cylinder to the second brake cylinder in lap position.

10. In an air brake, the combination with a primary brake cylinder, a secondary brake cylinder, and a pressure operated locking mechanism for the first brake cylinder, of a valve device operated by train pipe pressure for controlling the admission of air from the first brake cylinder to the second brake cylinder and to the locking mechanism.

11. In an air brake, the combination with a primary brake cylinder, a secondary brake cylinder, and a fluid pressure operated locking mechanism, of means for supplying air from the first brake cylinder to the second brake cylinder and to the locking mechanism after the first brake piston has completed its stroke.

12. In an air brake, the combination with a primary brake cylinder, a secondary brake cylinder, and a pressure operated locking mechanism, of means for supplying air from the first brake cylinder to the second brake cylinder and to the locking mechanism after the first brake piston has completed its stroke, and means for restricting the area of the second brake piston exposed to air pressure before its outward movement.

13. In an air brake, the combination with a primary brake cylinder and piston, of a secondary brake cylinder and piston and a locking mechanism comprising two oppositely movable clamps or jaws for engaging one of the piston rods, and means subject to air pressure for operating said clamps.

14. In an air brake, the combination with a primary brake piston having oppositely located teeth, of a secondary brake cylinder and piston, and a locking mechanism comprising two movable clamps or jaws for engaging the teeth of the first piston rod, a wedge for actuating said jaws, and a piston subject to brake cylinder pressure for operating the wedge.

In testimony whereof I have hereunto set my hand.

FRANCIS L. CLARK.

Witnesses:—
R. F. EMERY,
JAS. B. MACDONALD.